United States Patent
Tang et al.

(10) Patent No.: US 12,469,554 B2
(45) Date of Patent: Nov. 11, 2025

(54) DEVICES, CHIPS, AND ELECTRONIC EQUIPMENT FOR SENSING-MEMORY-COMPUTING SYNERGY

(71) Applicant: TSINGHUA UNIVERSITY, Beijing (CN)

(72) Inventors: Wenjun Tang, Beijing (CN); Xueqing Li, Beijing (CN); Weihang Long, Beijing (CN); Jialong Liu, Beijing (CN); Yilun Zhong, Beijing (CN); Chen Jiang, Beijing (CN); Huazhong Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 181 days.

(21) Appl. No.: 18/521,746

(22) Filed: Nov. 28, 2023

(65) Prior Publication Data

US 2024/0185916 A1 Jun. 6, 2024

(30) Foreign Application Priority Data

Dec. 1, 2022 (CN) .......................... 202211538469.1
Jan. 17, 2023 (CN) .......................... 202310077302.8

(51) Int. Cl.
*G06F 7/544* (2006.01)
*G11C 13/00* (2006.01)

(52) U.S. Cl.
CPC .......... *G11C 13/004* (2013.01); *G06F 7/5443* (2013.01); *G11C 13/0026* (2013.01); *G11C 13/0028* (2013.01)

(58) Field of Classification Search
CPC .............. G11C 13/004; G11C 13/0026; G11C 13/0028; G06F 7/5443
(Continued)

(56) References Cited

U.S. PATENT DOCUMENTS 10,381,071 B1 * 8/2019 Si ........................... G11C 7/062
12,105,986 B2 * 10/2024 Li ........................... G11C 11/54
(Continued)

*Primary Examiner* — Ly D Pham
(74) *Attorney, Agent, or Firm* — ArentFox Schiff LLP; Joseph M. Maraia

(57) ABSTRACT

The present disclosure relates to a sensing-memory-computing synergy device, chip and electronic device. The said device comprises: at least one sensing-memory-computing synergy cell, wherein each sensing-memory-computing synergy cell comprises K sensing elements, where the first end of each sensing element is connected to wordline, the second end of each sensing element is connected to bitline, the sensing element can sense changes in external inputs, and K is an integer greater than or equal to zero; a control module which controls the voltages of each wordline and bitline so that the sensing-memory-computing synergy cell can perform desired operations, and sense the voltage or current on bitlines to obtain the operation results. The present embodiment of the disclosure implements the sensing-memory-computing synergy cell by sensing elements, which combines sensing and in-memory computing. The sensing elements gather sensor data from external inputs, and the sensing-memory-computing synergy operation is performed by controlling the voltages on wordlines and bitlines. The present embodiment of the disclosure enables the in-situ sensing, memory and computing functions in a device with decreased wiring and control complexity, which lowers the computing latency and improves robustness and energy efficiency.

14 Claims, 8 Drawing Sheets

(58) Field of Classification Search
USPC .......................................................... 365/148
See application file for complete search history.

(56) References Cited

U.S. PATENT DOCUMENTS

| | | | | |
|---|---|---|---|---|
| 2005/0104103 A1* | 5/2005 | Hamamoto | ............ | H10B 69/00 |
| | | | | 257/295 |
| 2017/0365336 A1* | 12/2017 | Lin | ..................... | G11C 11/1673 |
| 2023/0186986 A1* | 6/2023 | Chun | ..................... | G06N 3/065 |
| | | | | 365/148 |

* cited by examiner

DEVICES, CHIPS, AND ELECTRONIC EQUIPMENT FOR SENSING-MEMORY-COMPUTING SYNERGY

CROSS-REFERENCE TO RELATED APPLICATIONS

This application claims priority to Chinese Patent Application No. 202211538469.1 filed on Dec. 1, 2022 and Chinese Patent Application No. 202310077302.8 filed on Jan. 17, 2023, the disclosure of which are incorporated herein by reference in their entireties.

FIELD

The present invention relates to the integrated circuit technique, and more particularly to a kind of sensing-memory-computing synergy devices, chips, and electronic equipment.

BACKGROUND

Nowadays, the number of IT devices around the world has reached tens of billions. With the rapid development of artificial intelligence (AI), electronic devices are gradually becoming intelligent, which raises higher requirements for edge sensing and computing. Despite the breakthroughs in the field of AI algorithms, conventional hardware implementation of sensing systems directly senses analog-domain signals, converts them into digital signals, and then transmits the digital signals for post-processing or cloud-end computing. This scheme has high energy consumption and low processing speed due to the large amounts of data transfer, and also, brings security issues of user privacy. Thus, the conventional scheme can hardly meet the requirements of real-time low-power processing of massive data for intelligent electronic devices. To this end, conventional signal processing requires breakthroughs in circuits and architectures. The sensing-memory-computing synergy (SMCS) architecture aims to integrate and co-optimize in-memory computing and in-sensor computing, offering a promising solution to address the bottleneck issues associated with data transfers between modules.

In recent years, designs with sensing-memory-computing synergy have been applied in edge computing scenarios including vision, speech, and touch, which achieve more advanced performance than conventional ones. For CMOS-based near-sensor image feature extraction, analog signal processing scale-invariant feature transform (ASP-SIFT) architecture is adopted for keypoint detection in the analog domain, which reduces the processing time to approximately the settling time of the circuit network (refer to Zichen Fan, Zheyu Liu, Zheng Qu, Fei Qiao, Qi Wei, Xinjun Liu, Yinan Sun, Shuzheng Xu, and Huachong Yang, "ASP-SIFT: Using Analog Signal Processing Architecture to Accelerate Keypoint Detection of SIFT Algorithm," IEEE TRANSACTIONS ON VERY LARGE SCALE INTEGRATION (VLSI) SYSTEMS. 2020, 28(1), pp. 198-211). For in-sensor image classification, a high-parallel fully connected neural network can be implemented by sensor pixels with programmable photoresponsivity. The in-situ image processing can achieve fast image classification with ~50 ns latency (refer to Mennel, L., Symonowicz, J., Wachter. S. et al. Ultrafast machine vision with 2D material neural network image sensors. Nature 579, 62-66 (2020)). For CMOS-based near-sensor convolution operation, mixed-signal circuit architecture can reduce the power consumption compared with the digital implementation (refer to Zhe Chen, Huifeng Zhu, Erxiang Ren, Zheyu Liu, Kaige Jia, Li Luo, Xuan Zhang, Qi Wei, Fei Qiao, Xinjun Liu, and Huazhong Yang, "Processing Near Sensor Architecture in Mixed-Signal Domain With CMOS Image Sensor of Convolutional-Kernel-Readout Method," IEEE TRANSACTIONS ON CIRCUITS AND SYSTEMS-I: REGULAR PAPERS. 2020, 67(2), pp. 389-400). For CMOS-based speech recognition, a mixed-signal processing (MSP) architecture is exploited to perform analog data preprocessing, which reduces the energy and latency cost of analog-to-digital conversion and improves the accuracy of the recognition (refer to Qin Li, Yuze Yang, Tianxiang Lan, Huifeng Zhu, Qi Wei, Fei Qiao, Xinjun Liu, Huazhong Yang, "MSP-MFCC: Energy-Efficient MFCC Feature Extraction Method with Mixed-Signal Processing Architecture for Wearable Speech Recognition Applications," IEEE Access, 2020).

In-memory computing (IMC) circuits and architectures based on conventional CMOS or emerging devices have been widely researched aiming at edge processing. IMC can solve the "memory wall" problem in conventional von Neumann architecture effectively, which is enabled by greatly decreased data movement with logic, pattern matching, or multiply-accumulation operations performed in the memory cell or array. Currently, demonstrations of IMC based on static random-access memory (SRAM), nonvolatile memory (NVM), and embedded dynamic random-access memory (eDRAM) have shown high energy efficiency. NVM-based IMC can store weights during power-off. Moreover, the in-situ calculations in NVM eliminate the need to frequently load and move the weight data across the memory hierarchy. However, the NVM-based IMC is limited by the high energy consumption of write operations and the endurance limit of refresh counts, so that the NVM-based IMC is more suitable for scenarios that do not require frequent weight updates (refer to J.-M. Hung, X. Li. J. Wu and M.-F. Chang, "Challenges and Trends in Developing Nonvolatile Memory-Enabled Computing Chips for Intelligent Edge Devices," in IEEE Transactions on Electron Devices, vol. 67, no. 4, pp. 1444-1453, April 2020). In contrast, SRAM-based IMC provides lower write latency and energy, and nearly unlimited write times, which is more preferable for computing with small-to-medium memory capacity requirements (refer to C.-J. Jhang, C.-X. Xue, J.-M. Hung, F.-C. Chang and M.-F. Chang, "Challenges and Trends of SRAM-Based Computing-In-Memory for AI Edge Devices," in IEEE Transactions on Circuits and Systems I: Regular Papers, vol. 68, no. 5, pp. 1773-1786, May 2021). In recent years, eDRAM-based IMC has shown both high memory density and high endurance. Exploiting the co-design with low-leakage devices such as oxide thin film transistors (TFTs) and circuit designs such as differential storage schemes, the refresh frequency of eDRAM can be reduced significantly, enabling low quiescent power consumption (refer to J. Liu et al., "Low-Power and Scalable Retention-Enhanced IGZO TFT eDRAM-Based Charge-Domain Computing," 2021 IEEE International Electron Devices Meeting (IEDM), San Francisco, CA, USA, 2021, pp. 21.1.1-21.1.4).

For large-area flexible applications, eDRAM-based IMC is mainly explored. Flexible Indium-Gallium-Zinc-Oxide thin-film transistors (IGZO TFTs) with the characteristics of ultra-low leakage and large-area integration enable eDRAM IMC with high retention time, low refresh frequency, and high memory density. In the eDRAM IMC design with integrated silicon MOSFETs and IGZO TFTs, the weight data is represented by the voltage on the storage capacitor, and the multiplication operation is performed utilizing the quadratic I-V characteristics of MOSFET's saturation region (refer to Kurokawa Y, Aoki T, Kozuma M, Kimura H, Kanemura T, Ando Y and Yamazaki S 2020 CAAC-IGZO FET/Si-FET hybrid structured analog multiplier and vector-by-matrix multiplier for neural network Japanese Journal of Applied Physics 59 SGGB03). However, the computing accuracy under the saturation region is degraded for short-channel devices, and the peripherals have high complexity and limited accuracy. Therefore, IMC with higher accuracy is suggested under pure TFT technology. The gate of the computing TFT is connected to a much higher voltage than drain-source voltage. Thus a higher linearity is observed where the design has higher tolerance tonon-ideal output characteristics of TFT. The multiplication result is readout through differential current with I-V characteristics in the linear region (J. Liu, W. Tang, Y. Liu, H. Yang and X. Li, "Almost-Nonvolatile IGZO-TFT-Based Near-Sensor In-Memory Computing," 2021 IEEE International Symposium on Circuits and Systems (ISCAS), Daegu, Korea, 2021, pp. 1-5). Nevertheless, leakage-induced charge loss and process, voltage, and temperature (PVT) variation cause nonlinear drift of computing current, limiting the stability of such eDRAM IMC scheme. A charge-domain eDRAM IMC is then proposed. By differential cell storage scheme, the immunity to leakage- and PVT-induced variation is greatly enhanced, thus achieving higher robustness and longer retention (refer to J. Liu et al., "Low-Power and Scalable Retention-Enhanced IGZO TFT eDRAM-Based Charge-Domain Computing," 2021 IEEE International Electron Devices Meeting (IEDM), San Francisco, CA, USA, 2021, pp. 21.1.1-21.1.4).

However, the related technologies based on TFTs or CMOS MOSFETs have disadvantages including high energy consumption and high computing latency of sensor data transmission, as well as low reliability and high wiring and control complexity.

SUMMARY

The present disclosure aims to provide a SMCS device, comprising:
a plurality of SMCS cells, wherein each SMCS cell comprises K sensing elements, where the first end of each sensing element is connected to wordline, the second end of each sensing element is connected to bitline, the sensing element can sense changes in external inputs, and K is an integer greater than or equal to zero;
a control module connected to the wordlines and bitlines of each SMCS cell, wherein the control module is configured to
control the voltages of each wordline and bitline so that the SMCS cell can perform desired operations, and
sense the voltage or current on bitlines to obtain the operation results.

In an embodiment of the present disclosure, the sensing elements include resistive sensors or capacitive sensors, and the stored value of the SMCS device is represented by at least one of the total initial resistance of the resistive sensor under a first preset input condition, the total initial capacitance of the capacitive sensor under a second preset input condition, and the pattern of connection between the sensing elements in the SMCS cell and the wordlines,
wherein the resistive sensor can change its resistance according to the sensed external inputs, and the capacitive sensor can change its capacitance according to the sensed external inputs.

In an embodiment of the present disclosure, the SMCS cell consists of a first resistive sensor, wherein the first end of the first resistive sensor is connected to any one of the N wordlines, and the second end of the first resistive sensor is connected to the bitline,
wherein the voltage on each wordline represents the weight value, the wordline connected by the first resistive sensor represents the stored weight value in the SMCS cell, and N is a positive integer.

In an embodiment of the present disclosure, the desired operations of the SMCS cell include multiplication operation and multiply-accumulation operation, wherein the control module is configured to
drive the wordlines connected to the first end of the first resistive sensors so that the SMCS cells represent the target weight values for computing, where the voltages on the wordlines correspond to the target weight values;
control the voltage on the bitline to a low voltage;
readout the current of the bitline and obtain the result of the operation. If the bitline is connected to one SMCS cell, the result of the operation is the multiplication between the target weight value and the sensing data from the first resistive sensor. If the bitline is connected to more than one SMCS cell, the result of the operation is the accumulation of the multiplication result of each SMCS cell, that is, the result of the multiply-accumulation operation.

In an embodiment of the present disclosure, the SMCS cell consists of more than one second resistive sensor, wherein the first ends of the second resistive sensors are connected to the same wordline, and the second ends of the second resistive sensors are connected to the bitline,
wherein the number of the second resistive sensors represents the stored weight value in the SMCS cell.

In an embodiment of the present disclosure, the desired operations of the SMCS cell include multiplication operation and multiply-accumulation operation, wherein the control module is configured to
drive the wordlines connected to the first end of the second resistive sensors using a high voltage, so that the SMCS cells represent the target weight values for computing;
control the voltage on the bitline to a low voltage;
readout the current of the bitline and obtain the result of the operation. If the bitline is connected to one SMCS cell, the result of the operation is the multiplication between the target weight value in and the sensing data from the sensing elements. If the bitline is connected to more than one SMCS cell, the result of the operation is the accumulation of the multiplication result of each SMCS cell, that is, the result of multiply-accumulation operation.

In an embodiment of the present disclosure, the SMCS cell consists of a first capacitive sensor, wherein the first end of the first capacitive sensor is connected to any one of the N wordlines, and the second end of the first capacitive sensor is connected to the bitline,
wherein the voltage on each wordline represents the weight value, the wordline connected by the first capacitive sensor represents the stored weight value in the SMCS cell, and N is a positive integer.

In an embodiment of the present disclosure, the desired operations of the SMCS cell include multiplication operation and multiply-accumulation operation, wherein the control module is configured to control the bitline to be floating;

drive the wordlines connected to the first end of the first capacitive sensors so that the SMCS cells represent the target weight values for computing, where the voltages on the wordlines correspond to the target weight values;

readout the voltage of the bitline and obtain the result of the operation. If the bitline is connected to one SMCS cell, the result of the operation is the multiplication between the target weight value and the sensing data from the first capacitive sensor. If the bitline is connected to more than one SMCS cell, the result of the operation is the accumulation of the multiplication result of each SMCS cell, that is, the result of the multiply-accumulation operation.

In an embodiment of the present disclosure, the SMCS cell consists of K second capacitive sensor, wherein the first ends of Ki second capacitive sensors are connected to a first wordline, the second ends of said Ki second capacitive sensors are connected to the bitline, the first ends of (K-Ki) second capacitive sensors are connected to a second wordline, the second ends of said Ki second capacitive sensors are connected to the bitline, wherein the number of the second capacitive sensors connected to the first wordline represents the stored weight value in the SMCS cell, Ki and K are integers where $0 \leq Ki < K$.

In an embodiment of the present disclosure, the desired operations of the SMCS cell include multiplication operation and multiply-accumulation operation, wherein the control module is configured to control the bitline to be floating;

drive the first wordlines using a high voltage and drive the second wordlines using a low voltage, so that the SMCS cells represent the target weight values for computing;

readout the voltage of the bitline and obtain the result of the operation. If the bitline is connected to one SMCS cell, the result of the operation is the multiplication between the target weight value and the sensing data from the sensing elements. If the bitline is connected to more than one SMCS cell, the result of the operation is the accumulation of the multiplication result of each SMCS cell, that is, the result of the multiply-accumulation operation.

In an embodiment of the present disclosure, the plurality of SMCS cells are arranged in a plurality of rows and a plurality of columns with electrical connections. The bitline of the SMCS cells in the same column are connected respectively, and the wordline of the SMCS cells in the same row are connected respectively.

In an embodiment of the present disclosure, the control module is configured to control the voltage of each wordline to any one of the voltages corresponding to the target weight values, high voltage, or low voltage, and control the voltage of each bitline to a first preset voltage, to clear the charge on the capacitive sensors in each SMCS cell before the desired operations of the SMCS cells.

In an embodiment of the present disclosure, the chip comprises said SMCS device.

In an embodiment of the present disclosure, the electronic device comprises said chip.

The present embodiment of the disclosure implements the sensing-memory-computing synergy cell by sensing elements, which combines sensing and in-memory computing. The sensing elements gather sensor data from external inputs, and the sensing-memory-computing synergy operation is performed by controlling the voltages on wordlines and bitlines. The present embodiment of the disclosure enables the in-situ sensing, memory and computing functions in a device with decreased wiring and control complexity, which lowers the computing latency and improves robustness and energy efficiency.

It should be understood that the foregoing general description and the following detailed description are exemplary and explanatory, and are not intended to restrict the scope of the present disclosure. Additional features and aspects of the present disclosure will become apparent from the detailed description of the present embodiment of the disclosure, as illustrated in the following drawings.

BRIEF DESCRIPTION OF THE DRAWINGS

The following drawings, which are incorporated into the detained description, illustrate the embodiment from the present disclosure, and are used to explain the technical solutions of the present disclosure along with the detained description.

DETAILED DESCRIPTION

Figure 1:
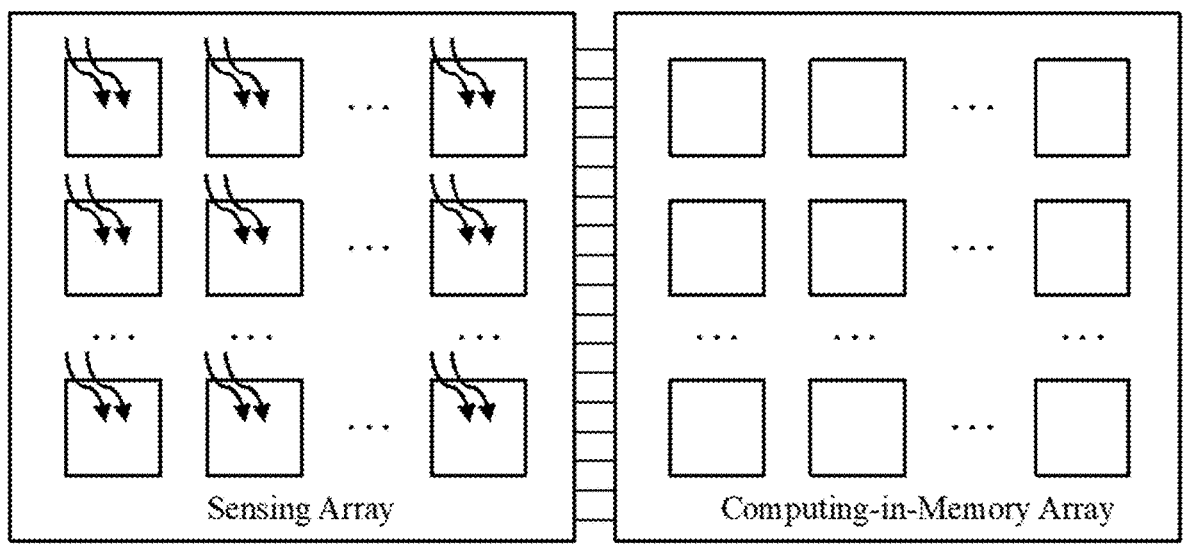
FIG. 1 is a block diagram illustrating a near-sensor IMC design in related technologies.

Description will be shown in detail below according to embodiments of the present disclosure. Examples of embodiments are illustrated in the accompanying drawings, in which, the same or similar numbers represent the same or similar elements or elements with the same or similar functions. Although various aspects of the embodiments are shown in the drawings, it is not necessary to draw the drawings to scale unless otherwise noted.

In the description of the present disclosure, it should be understood that the orientation or positional relationship indicated by the terms: "length", "width", "up", "down", "front", "back", "left", "right", "vertical", "horizontal", "top", "bottom", "inside", "outside" is based on the orientation or positional relationship shown in the drawings. It is only for the convenience of describing the present disclosure and simplifying the description, rather than indicating or implying that the device or element must have a specific orientation, be constructed and operate in a specific orientation, which cannot be understood as a limitation of the present disclosure.

In addition, the terms "first" and "second" are used for descriptive purposes only and cannot be understood as indicating or implying relative importance or implicitly indicating the number of technical features indicated. Thus, the features defined with "first" and "second" can explicitly or implicitly include one or more of the features. In the description of the present disclosure, "multiple" means two or more, unless otherwise specifically indicated.

In the present disclosure, unless otherwise specified and defined, the terms "installation", "connection", "connection" and "fixation" shall be understood in a broad sense. For example, they can be fixed connection, detachable connection or integrated connection; It can be mechanical connection or electrical connection; It can be directly connected, or indirectly connected through intermediate media, or the internal connection of two components or the interaction between two components. For those of ordinary skill in the art, the specific meaning of the above terms in the present disclosure can be understood according to the specific situation.

Here, the special word "exemplary" means "used as an example, an embodiment, or an illustration". Any embodiment described herein as "exemplary" need not be interpreted as superior or better than other embodiments.

In addition, in order to better illustrate the present disclosure, numerous specific details are given in the following specific embodiments. It should be understood by those skilled in the art that the present disclosure can also be implemented without certain specific details. In some examples, the methods, means, elements and circuits familiar to those skilled in the art are not described in detail, so as to highlight the subject matter of the present disclosure.

Please refer to FIG. 1, which is a block diagram illustrating a near-sensor IMC design in related technologies.

Corresponding to the description of the background techniques, among the related techniques, the solutions of deploying intelligent edge computing on the sensor side face challenges including high data transfer overhead and high complexity. For example, as shown in FIG. 1, a related technique integrates IMC array near the sensor array, in which the IMC array can exploit devices such as SRAM, NVM, and eDRAM mentioned in the background techniques (refer to J. Liu, W. Tang, Y. Liu, H. Yang and X. Li, "Almost-Nonvolatile IGZO-TFT-Based Near-Sensor In-Memory Computing," 2021 IEEE International Symposium on Circuits and Systems (ISCAS), Daegu, Korea, 2021, pp. 1-5). In this technique, the IMC array directly processes the analog sensor data, thus the amount of data transmitted to the external is greatly reduced. However, there still exist data transfers between the separated IMC array and sensing array. The interface circuits such as analog buffers can bring large latency and energy overhead. For example, a related technique can realize computing within the sensor. However, the fabrication process of the sensor-memory-computing device in this solution is more complex than normal sensors, and each pixel requires weight write and selection control circuitry, which leads to high wiring and control complexity.

To tackle the challenges of high complexity, high latency, low reliability, and low energy efficiency in the related techniques, the present embodiment of the disclosure proposes an SMCS device comprising a plurality of SMCS cells, wherein each SMCS cell comprises K sensing elements, where the first end of each sensing element is connected to wordline, the second end of each sensing element is connected to bitline, the sensing element can sense changes in external inputs, and K is an integer greater than or equal to zero; a control module connected to the wordlines and bitlines of each SMCS cell, wherein the control module is configured to control the voltages of each wordline and bitline so that the SMCS cell can perform desired operations, and sense the voltage or current on bitlines to obtain the operation results. The present embodiment of the disclosure implements the sensing-memory-computing synergy cell by sensing elements, which combines sensing and in-memory computing. The sensing elements gather sensor data from external inputs, and the sensing-memory-computing synergy operation is performed by controlling the voltages on wordlines and bitlines. The present embodiment of the disclosure enables the in-situ sensing, memory and computing functions in a device with decreased wiring and control complexity, which lowers the computing latency and improves robustness and energy efficiency.

Figure 2:
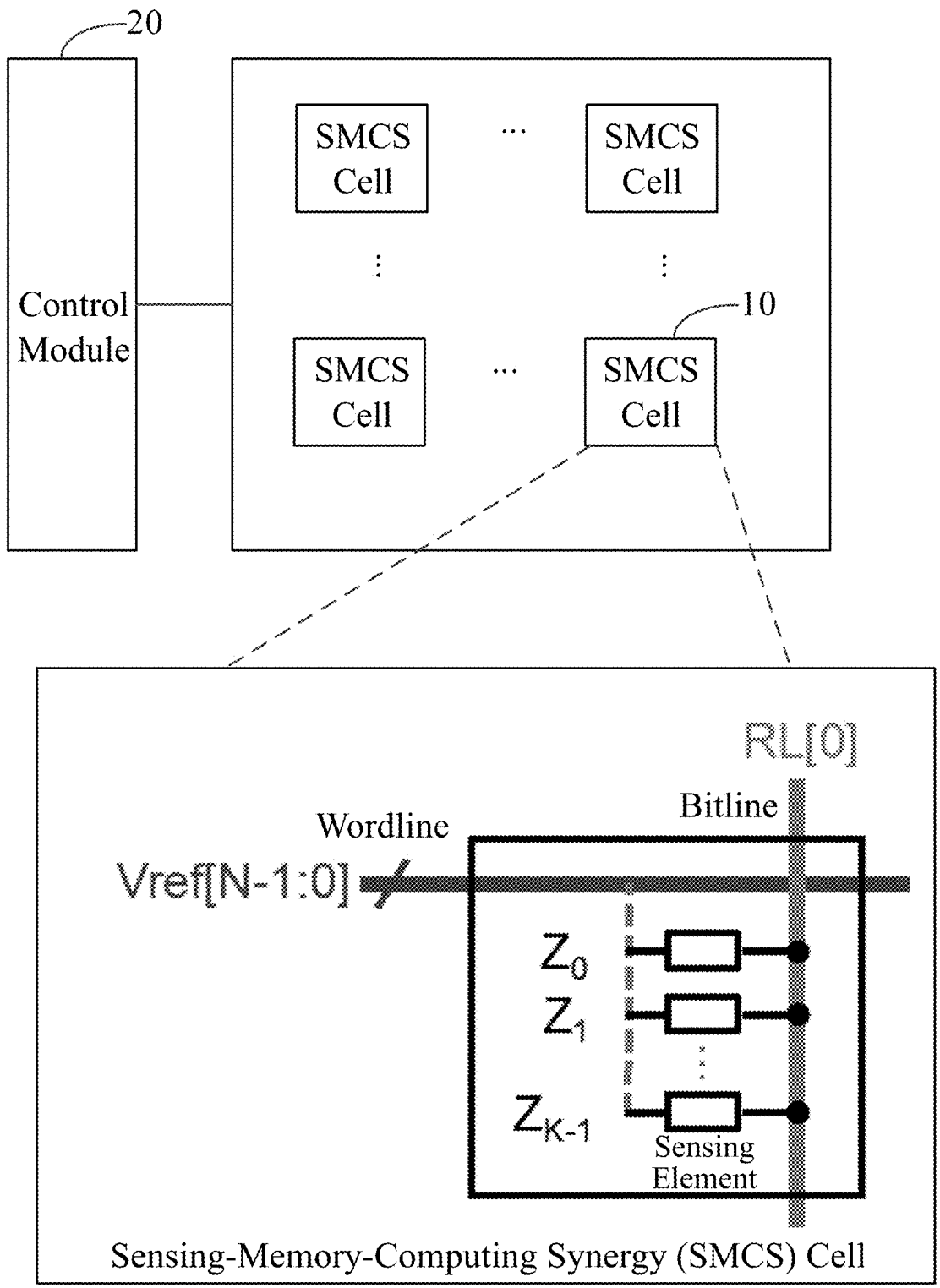
FIG. 2 is a block diagram illustrating an SMCS device based on an embodiment of the present disclosure.

Please refer to FIG. 2, which is a block diagram illustrating an SMCS device based on an embodiment of the present disclosure.

As shown in FIG. 2, the device comprises:
a plurality of SMCS cells 10, wherein each SMCS cell 10 comprises K sensing elements (e.g., $Z_0$–$Z_{K-1}$, where K is a positive integer), where the first end of each sensing element is connected to wordline (e.g., Vref[N−1:0], where N is a positive integer), the second end of each sensing element is connected to bitline (e.g., RL[0]), the sensing element can sense changes in external inputs;
a control module 20 connected to the wordlines and bitlines of each SMCS cell 10, wherein the control module 20 is configured to
control the voltages of each wordline and bitline so that the SMCS cell 10 can perform desired operations, and
sense the voltage or current on bitlines to obtain the operation results.

The embodiment of the present disclosure does not restrict the specific implementation of the control module 20. Those skilled in the art can choose a suitable implementation according to the actual situation and requirements. Exemplarily, the control module 20 may include a processing component that includes, but is not limited to, a separated processor, a discrete component, or a combination of processors and discrete components. The processor may include a controller with instruction execution functions in an electronic device, and the processor may be implemented in any appropriate way, for example, by one or more application-specific integrated circuits (ASIC), digital signal processors (DSP), digital signal processing devices (DSPD), programmable logic devices (PLD), field programmable gate arrays (FPGAs), microcontrollers, microprocessors, or other electronic components. Within the processor, the instructions can be executed through hardware circuits such as logic gates and switches.

Exemplarily, the control module 20 may include a wordline driving circuit, a bitline clamping circuit, a bitline sensing circuit, and other peripheral circuits. The wordline driving circuit drives the wordlines of each SMCS cell 10. The bitline clamping circuit controls the bitline voltage of each SMCS cell 10 within a preset range. The bitline sensing circuit readouts and analyzes the bitlines of each SMCS cell 10. Other peripheral circuit connects the external signals and the bitline sensing circuit, and perform computation according to the external signals and the output of the bitline sensing circuit. Of course, the embodiment of the present disclosure is not intended to restrict the implementations of the wordline driving circuit, the bitline clamping circuit, the bitline sensing circuit, and other peripheral circuits. Those skilled in the art can choose a suitable circuit implementation according to the actual situation and requirements, as long as the above functions can be accomplished.

The embodiment of the present disclosure is not intended to restrict the types and implementations of the sensing elements. Those skilled in the art can choose a suitable sensing element according to the actual situation and requirements. In an embodiment of the present disclosure, the sensing element can be a resistive sensor or a capacitive sensor. The stored value of the SMCS device 10 is represented by at least one of the total initial resistance of the resistive sensor under a first preset input condition, the total initial capacitance of the capacitive sensor under a second preset input condition, and the pattern of connection between the sensing elements in the SMCS cell and the wordlines, wherein the resistive sensor can change its resistance according to the sensed external inputs, and the capacitive sensor can change its capacitance according to the sensed external inputs.

The embodiment of the present disclosure is not intended to restrict the content of the first preset input condition and the second preset input condition. Those skilled in the art can set suitable conditions according to the actual situation and requirements. Exemplarily, the first preset input condition and the second preset input condition can be set according to the type of the sensing element. Exemplarily, assuming that the sensing element is a resistive pressure sensor, the first preset input condition can be no external pressure, that is, said initial resistance of the resistive sensor is the resistance without external pressure. Exemplarily, assuming that the sensing element is a capacitive pressure sensor, the second preset input condition can be no external pressure, that is, said initial capacitance of the capacitive sensor is the capacitance without external pressure. It can be noted that the initial resistance value and the initial capacitance value are related to the selection of the first preset input condition and the second preset input condition, respectively. If the first preset input condition and the second preset input condition are changed, the initial resistance and the initial capacitance change accordingly. Moreover, the resistive or capacitive sensor includes various types such as pressure-sensitive and photosensitive. Correspondingly, the first preset input condition and the second preset input condition are varied. Those skilled in the art can determine the corresponding first preset input condition and second preset input condition according to the application scenarios.

The above description is an exemplary introduction of the sensing element including the resistive sensor or the capacitive sensor. It should be understood that the embodiments of the present disclosure are not limited thereto. The sensing element may also include other types to adapt to different application scenarios, thereby determining the first preset input condition and the second preset input condition. It can be observed that the proposed SMCS device of the embodiment of the present disclosure has high adaptability and flexibility to different applications.

Different from the near-sensor IMC solution based on TFT in the related technique, the embodiments of the present disclosure construct a sensing-memory-computing synergy circuit architecture that entirely uses passive components, which exploits the characteristic of the sensing elements such as resistive sensor and capacitive sensor. Different from the IMC schemes in the related techniques which store the weight by voltage, charge, or nonvolatile state of the device, the embodiment of the present disclosure stores the weight as the different connections of the sensing elements or its initial impedance value. Further combining the IMC with sensing, the external inputs from the environment are sensed through the changes in impedance values of the sensing elements. By applying voltages to the wordlines connected to the sensing elements and analyzing the current or voltage on the bitlines connected to the sensing elements, the multiplication operation or multiply-accumulation operation can be implemented, thus realizing in-situ sensing, storage, and calculation.

The SMCS device of the embodiment of the present disclosure solves the problems of high latency and energy overhead introduced by the transmission of huge amounts of sensor data, as well as the "memory wall" issue caused by the physically separated computing unit and memory unit. It also eases the security issues of conventional signal processing which transfers the raw data to the cloud end. Also, integrated modules reduce the wiring complexity. Furthermore, the read-only storage enables nonvolatile multi-level weight data storage, which has low variation, high reliability, and reduced control complexity. Therefore, the embodiment of the present disclosure can achieve high computing and storage reliability in complex environments. The SMCS device built with resistive sensors exhibits a low total quiescent current when no external input is applied. The SMCS device built with capacitive sensors avoids DC power consumption. Therefore, the embodiment of the present disclosure can perform high energy efficiency considering sparse sensing events.

The embodiment of the present disclosure is not intended to restrict the arrangement method of the SMCS cells 10. Those skilled in the art can design a proper arrangement according to the actual situation and requirements.

Figure 3:
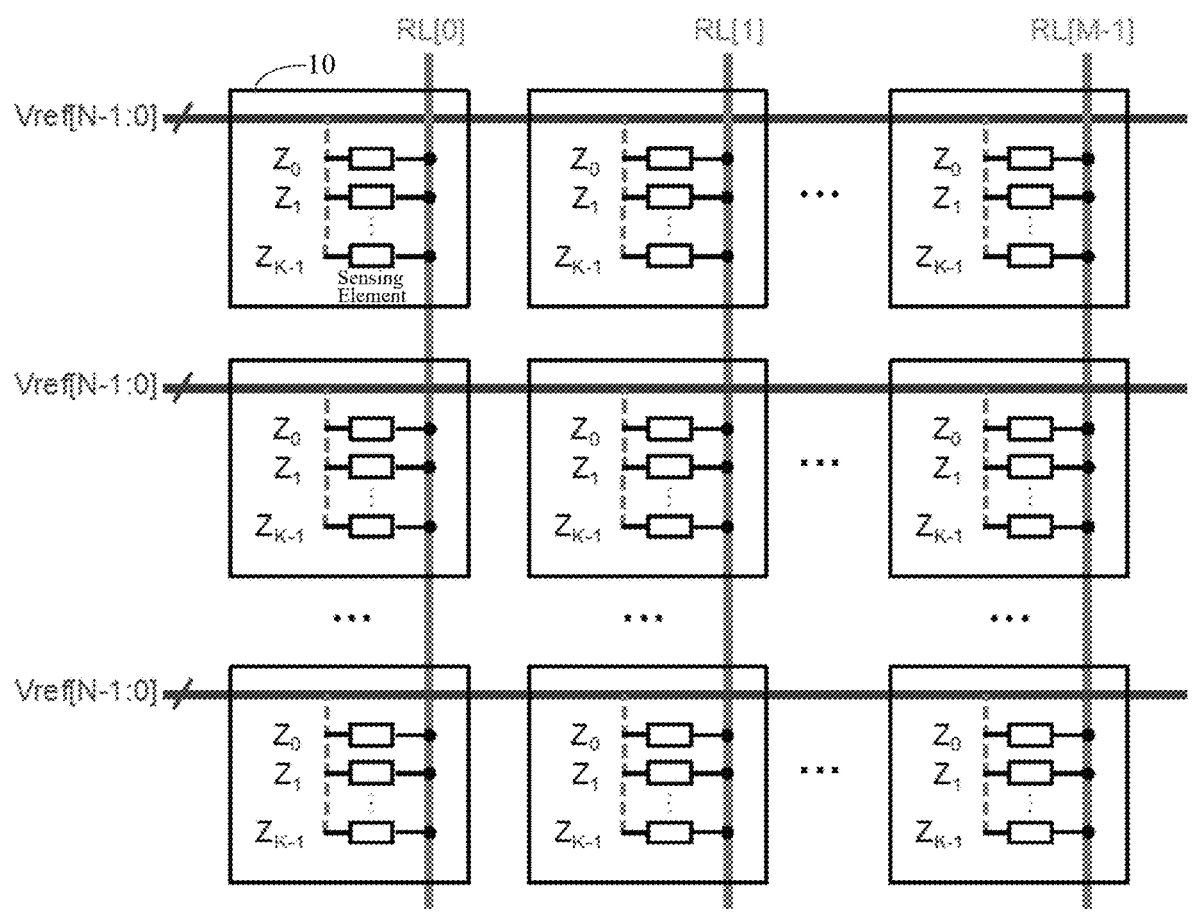
FIG. 3 is a schematic diagram illustrating the arrangement of the SMCS cells in an SMCS device based on an embodiment of the present disclosure.

Please refer to FIG. 3, which is a schematic diagram illustrating the arrangement of the SMCS cells 10 in an SMCS device based on an embodiment of the present disclosure.

In an embodiment of the present disclosure as shown in FIG. 3, a plurality of SMCS cells 10 are arranged in a plurality of rows and a plurality of columns with electrical connections. The bitline of the SMCS cells 10 in the same column are connected respectively, for example, the bitlines of SMCS cells in the first column are all connected to bitline BL[0]. The wordline of the SMCS cells in the same row are connected respectively, for example, the wordlines Vref[0]-Vref[N−1] of the SMCS cells in the first row are connected respectively.

Exemplarily, the SMCS array comprises L rows and M columns, where L and M are integers greater than 0). The embodiment of the present disclosure is not intended to restrict the size of the SMCS array. Those skilled in the art can assign a proper size according to the actual situation and requirements, in order to improve the flexibility and adaptability of the embodiment of the present disclosure.

It should be noted that although FIG. 2, FIG. 3 and other drawings depict examples where the SMCS cell 10 includes at least one sensing element, the embodiment of the present disclosure does not limit the number of sensing elements in each SMCS cell 10. Each SMCS cell 10 can include arbitrary non-negative integer K of sensing elements, that is, K=0, 1, 2, or more. Exemplarily, any number of SMCS cells in the SMCS array of the embodiment of the present disclosure can include 0 sensing elements. Exemplarily, K=0 can represent weight data equal to 0, or act as a placeholder.

For instance, in the case of a sensor array with an irregular shape, such as a glove-shaped sensor array. The SMCS cells are still arranged in rows and columns, while there may be columns with half of the positions that do not require sensor cells. In this scenario, the embodiment of the present disclosure can adopt SMCS cells 10 that include 0 sensing elements and only consist of wordlines and bitlines for placeholder purposes to form a complete array layout.

The embodiment of the present disclosure does not restrict the data and combinations of the sensing elements in each SMCS cell 10. The following examples are provided for illustration purposes.

Figure 4:
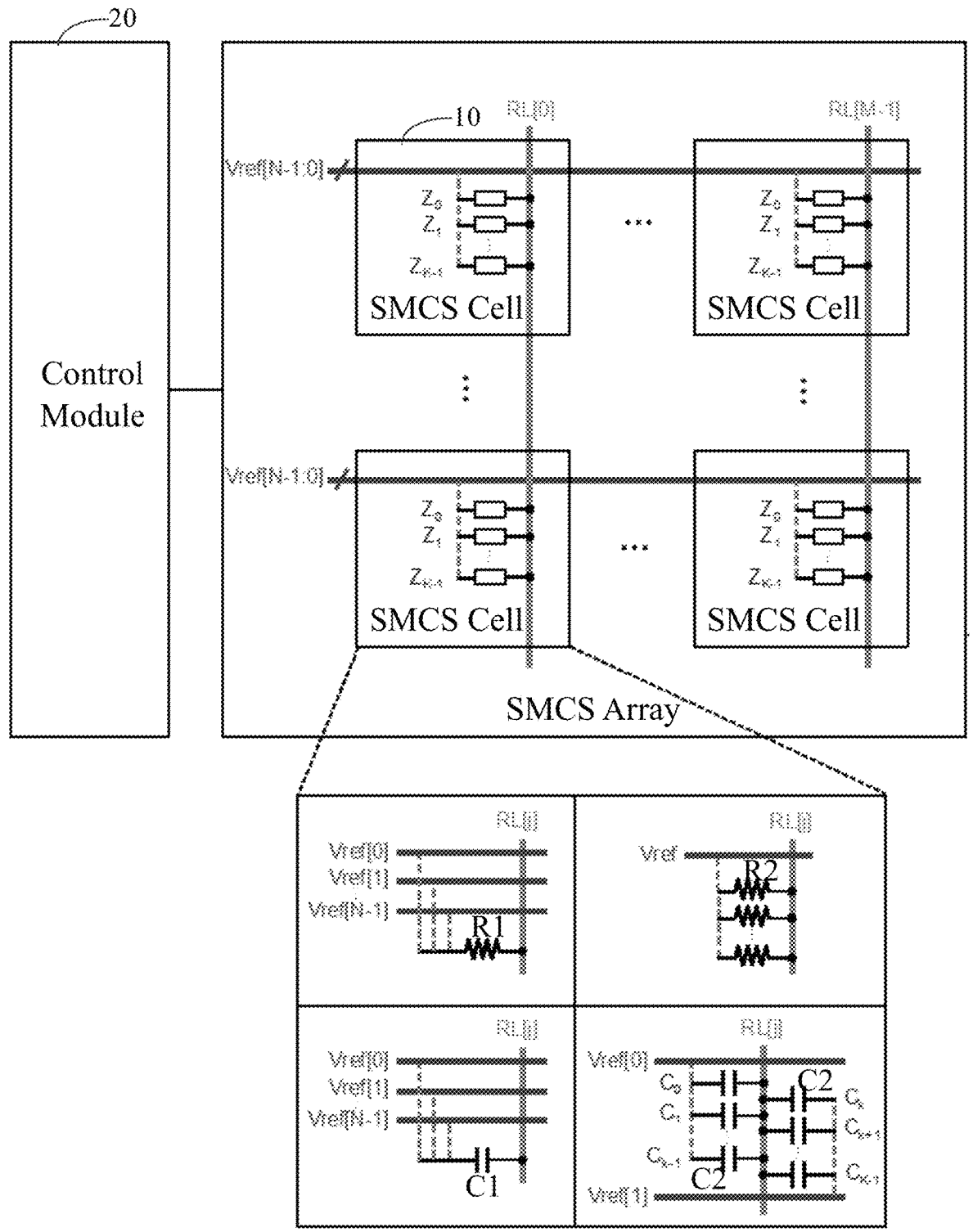
FIG. 4 is a block diagram illustrating different implementations of the SMCS cell in an SMCS device based on an embodiment of the present disclosure.

Please refer to FIG. 4, which is a block diagram illustrating different implementations of the SMCS cell in an SMCS device based on an embodiment of the present disclosure.

In an embodiment of the present disclosure as shown in FIG. 4, the SMCS cell 10 in the embodiment of the present disclosure can be implemented in various schemes. For example, it can be implemented by one first resistive sensor R1, multiple second resistive sensor R2 connected in parallel, one first capacitive sensor C1, or multiple second capacitive sensor C2 connected in parallel.

For different implementations of SMCS cell 10, the control module 20 in the embodiment of the present disclosure can perform different wordline and bitline driving methods to achieve the desired operations.

In an embodiment of the present disclosure, the control module 20 is configured to
drive the wordlines of the SMCS array;
clamp the voltage of the bitlines of the array to a preset range;
readout and analyze the current or voltage of the bitlines and obtain the result of the operation.

When performing the desired operations, the control module 20 applies one or multiple fixed reference voltages on the wordlines, and controls the voltages on the bitlines to a preset range. By observing the changes in currents on the bitlines, the calculation results of the multiplication operation or multiply-accumulation operation of sensing data and stored weights can be obtained.

In an embodiment of the present disclosure, the control module 20 is configured to
drive the wordlines of the SMCS array;
connect the bitlines of the array to a preset voltage or control them to be floating;
readout and analyze the current or voltage of the bitlines and obtain the result of the operation.

When performing the desired operations, the control module 20 applies a fixed voltage to all bitlines and wordlines at first. Then it controls the bitlines to be floating, and applies one or multiple fixed reference voltages on the wordlines. By observing the changes in voltages on the bitlines, the calculation results of the multiplication operation or multiply-accumulation operation of sensing data and stored weights can be obtained.

The following are the exemplary descriptions of the possible implementations of the SMCS cell 10 and control methods of the control module 20.

Figure 5:
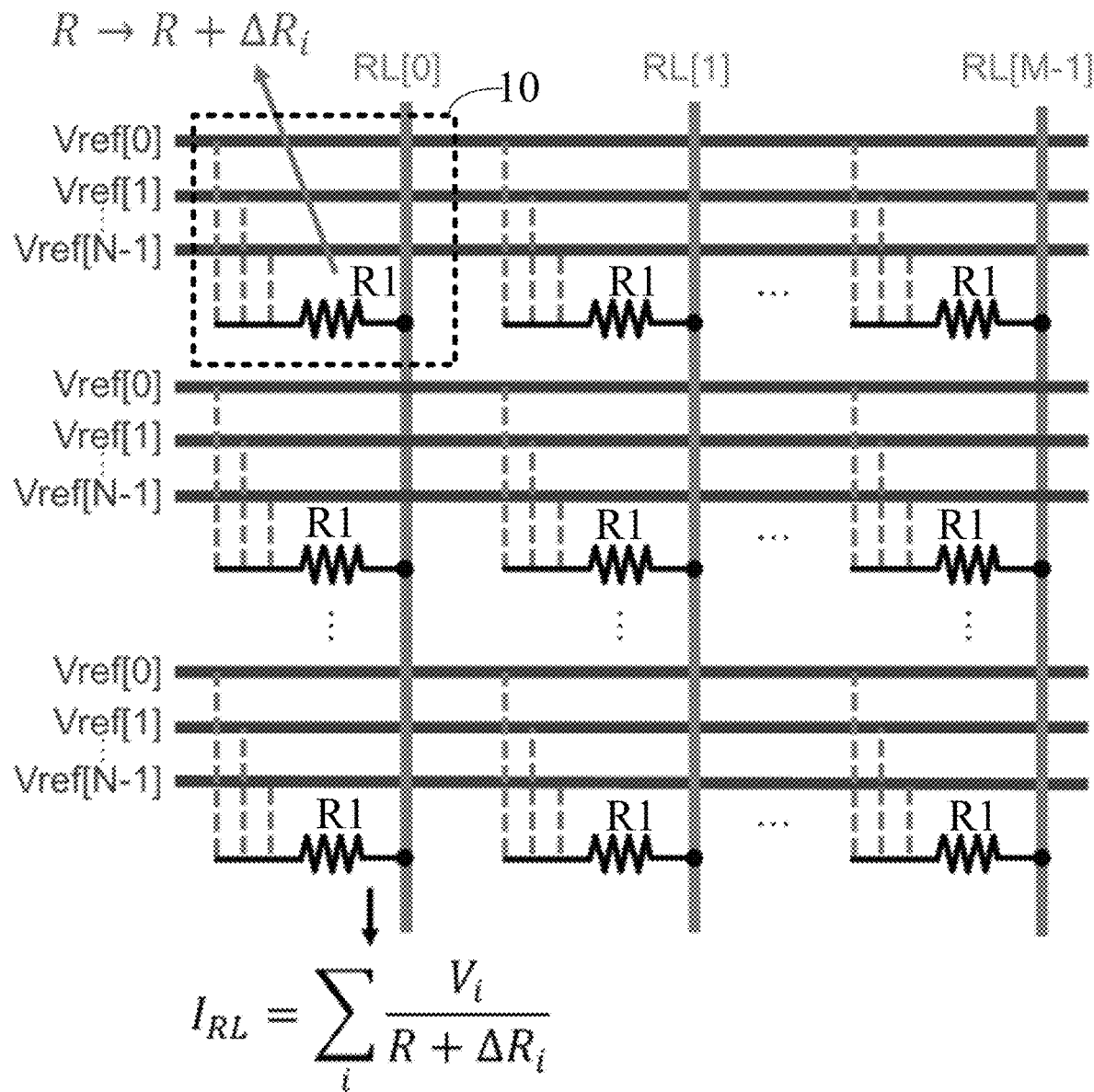
FIG. 5 is a schematic diagram illustrating the first implementation of the SMCS cell in an SMCS device based on an embodiment of the present disclosure.

Please refer to FIG. 5, which is a schematic diagram illustrating the first implementation of the SMCS cell 10 in an SMCS device based on an embodiment of the present disclosure.

In an embodiment of the present disclosure as shown in FIG. 5, the SMCS cell 10 consists of a first resistive sensor R1, wherein the first end of the first resistive sensor R1 is connected to any one of the N wordlines, and the second end of the first resistive sensor R1 is connected to the bitline. The voltage on each wordline represents the weight value, the wordline connected by the first end of the first resistive sensor R1 represents the stored weight value in the SMCS cell 10, and N is a positive integer.

In an embodiment of the present disclosure, the desired operations of the SMCS cell include multiplication operation and multiply-accumulation operation, wherein the control module 20 is configured to
drive the wordlines connected to the first end of the first resistive sensors R1 so that the SMCS cells 10 represent the target weight values for computing, where the voltages on the wordlines correspond to the target weight values;
control the voltage on the bitline to a low voltage;
readout the current of the bitline and obtain the result of the operation. If the bitline is connected to one SMCS cell 10, the result of the operation is the multiplication between the target weight value and the sensing data from the first resistive sensor R1. If the bitline is connected to more than one SMCS cell 10, the result of the operation is the accumulation of the multiplication result of each SMCS cell 10, that is, the result of the multiply-accumulation operation.

Exemplarily, multi-level weight storage is implemented by connecting the resistive sensor in the SMCS cell to different wordlines with different voltages. As shown in FIG. 5, N different voltages are applied to N wordlines of the SMCS cell, and the resistive sensor in the SMCS cell is connected to the wordlines according to the represented weights. N is a positive integer. Exemplarily; the first wordline is configured as $V_{ref}[0]$, the second wordline as $V_{ref}[1], \ldots$, and the Nth wordline as $V_{ref}[N-1]$. The bitlines are controlled by the control module to a fixed voltage, which is typically a low level, e.g., 0V. For example, if weight value $V_{ref}[W_i]$ needs to be stored in an SMCS cell, denoted as $V_i$, the first end of the resistive sensor in the SMCS cell is connected to the wordline that is configured with the voltage $V_i$. Therefore, the SMCS cell can contribute a current $I=V_i/(R+\Delta R_i)$ to the bitline, where R is the initial resistance of the first resistive sensor R1, and the resistance changes to $R+\Delta R_i$ when applying a specific external input (e.g., a specific pressure when the sensors are pressure resistive sensors). The initial resistance of the resistive sensor refers to the resistance when certain external inputs, serving as a reference, are simultaneously applied to each SMCS cell in the SMCS array. In an embodiment of the present disclosure, the resistive sensors are pressure resistive sensors, and the initial resistance refers to the resistance when no external pressure is applied. The total current on the bitline, denoted as $I_{RL}$, is the sum of the currents contributed by all SMCS cells connected to this bitline, i.e., $I_{RL}=\Sigma_i V_i/(R+\Delta R_i)$. This current corresponds to the multiply-accumulation result of the input sensor data and the stored weight data.

Exemplarily, assume that each SMCS cell has four wordlines, and different voltages are applied to the word lines to represent different weights. Exemplarily, the first wordline can be configured as −2V, corresponding to weight data of −2; the second wordline can be configured as −1V, corresponding to weight data of −1; the third wordline can be configured as 0V, corresponding to weight data of 0; the fourth wordline can be configured as 1V, corresponding to weight data of 1. Exemplarily, the control module can control the bitlines to 0V. Assuming that the SMCS cell needs to store weight data of −1, then the first end of the resistive sensor in the SMCS cell is connected to the second wordline with −1V voltage. Thus, the SMCS cell contributes a current of $I=V_i/(R+\Delta R_i)=-0.95$ mA to the bitline, where $R=1000\Omega$ is the initial resistance of the first resistive sensor R1, and the resistance value changes to $R+\Delta R_i=1050\Omega$ after applying specific pressure to the sensor, and $V_i=-1V$ is the voltage of the second wordline.

Figure 6:
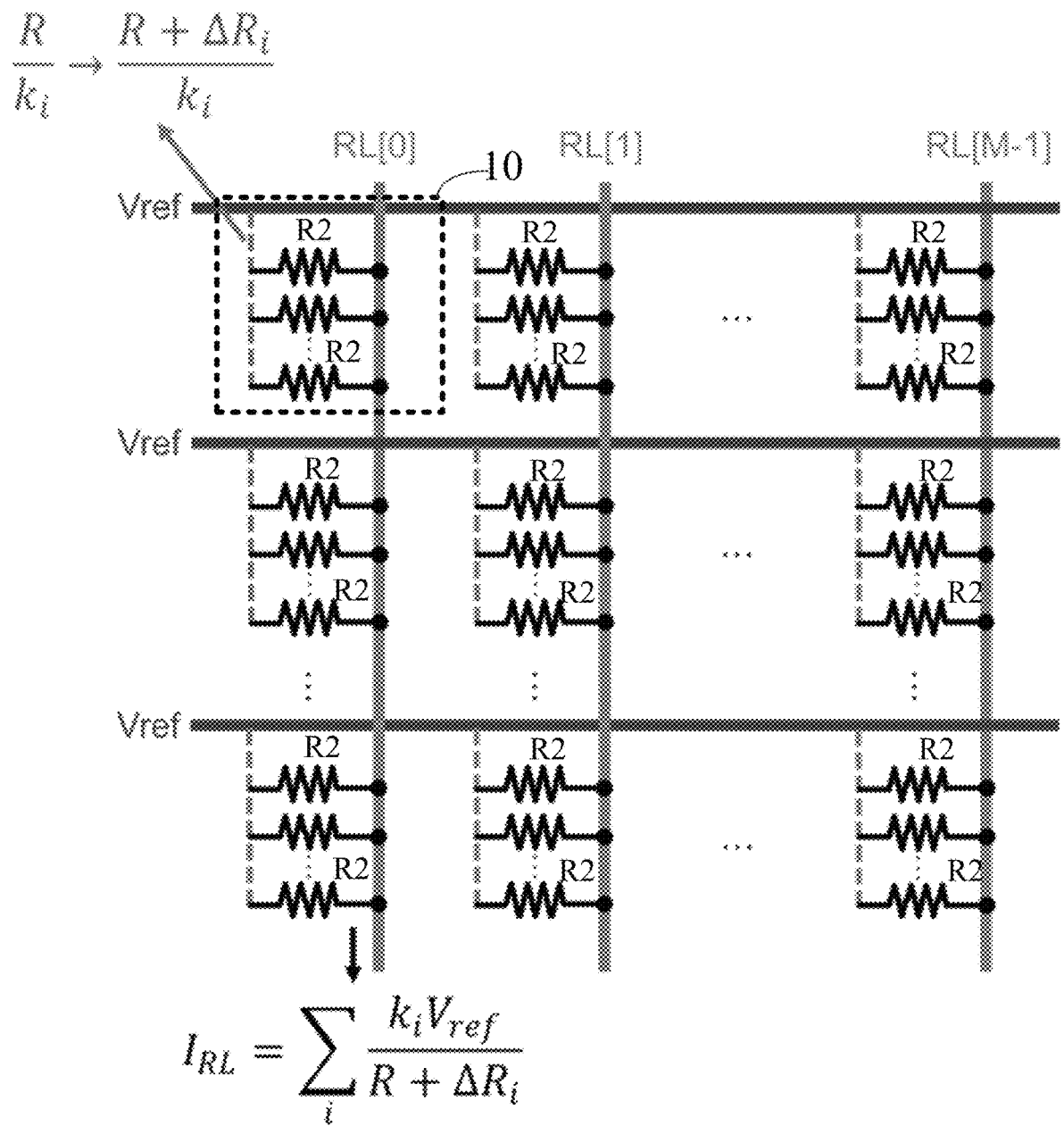
FIG. 6 is a schematic diagram illustrating the second implementation of the SMCS cell in an SMCS device based on an embodiment of the present disclosure.

Please refer to FIG. 6, which is a schematic diagram illustrating the second implementation of the SMCS cell 10 in an SMCS device based on an embodiment of the present disclosure.

In an embodiment of the present disclosure as shown in FIG. 6, the SMCS cell 10 consists of more than one second resistive sensor R2, wherein the first ends of the second resistive sensors R2 are connected to the same wordline, and the second ends of the second resistive sensors R2 are connected to the bitline. The number of the second resistive sensors R2 represents the stored weight value in the SMCS cell 10.

In an embodiment of the present disclosure, the desired operations of the SMCS cell include multiplication operation and multiply-accumulation operation, wherein the control module 20 is configured to
- drive the wordlines connected to the first end of the second resistive sensors R2 using a high voltage, so that the SMCS cells 10 represent the target weight values for computing;
- control the voltage on the bitline to a low voltage;
- readout the current of the bitline and obtain the result of the operation. If the bitline is connected to one SMCS cell 10, the result of the operation is the multiplication between the target weight value and the sensing data from the sensing elements. If the bitline is connected to more than one SMCS cell 10, the result of the operation is the accumulation of the multiplication result of each SMCS cell 10, that is, the result of multiply-accumulation operation.

Exemplarily, multi-level weight storage is implemented by different total initial resistance of the resistive sensors in the SMCS cell. In an embodiment of the present disclosure, the different total initial resistance of the resistive sensors is implemented by the different numbers of unit resistive sensors, i.e., second resistive sensors R2, connected in parallel. As shown in FIG. 6, the SMCS cell contains $k_i$ unit resistive sensors with initial resistance R, i.e., the second resistive sensor R2, which are connected in parallel. $k_i$ is a non-negative integer. Exemplarily, there is one wordline in each SMCS cell, which is applied to $V_{ref}$ by the control module. The bitlines are controlled by the control module to a fixed voltage, which is typically a low level, e.g., 0V. Therefore, the SMCS cell can contribute a current $I=k_iV_{ref}/(R+\Delta R_i)$ to the bitline, where R is the initial resistance of the second resistive sensor R2, and the resistance changes to $R+\Delta R_i$ when applying a specific external input (e.g., a specific pressure when the sensors are pressure resistive sensors). The total current on the bitline, denoted as $I_{RL}$, is the sum of the currents contributed by all SMCS cells connected to this bitline, i.e., $I_{RL}=\Sigma_i V_i/(R+\Delta R_i)$. This current corresponds to the multiply-accumulation result of the input sensor data and the stored weight data.

Exemplarily, assuming that an SMCS cell needs to store weight data of 4, then four parallelly-connected unit resistive sensors with initial resistance of $1000\Omega$ are included in the SMCS cell. The control module can apply a voltage of 5V to the wordline. Thus, the SMCS cell contributes a current of $I=k_i V_{ref}/(R+\Delta R_i)=19.04$ mA to the bitline, where $R=1000\Omega$ is the initial resistance of the second resistive sensor R2, and the resistance value changes to $R+\Delta R_i=1050\Omega$ after applying specific pressure to the sensor, $k_i=4$ is the number of the second resistive sensors R2 connected to the wordline representing the weight data, and $V_i=5V$ is the voltage of the wordline.

In an embodiment of the present disclosure, the multi-level weight storage can be represented by utilizing the total initial resistance of the resistive sensor and the pattern of connection to wordlines with different voltages simultaneously.

Figure 7:
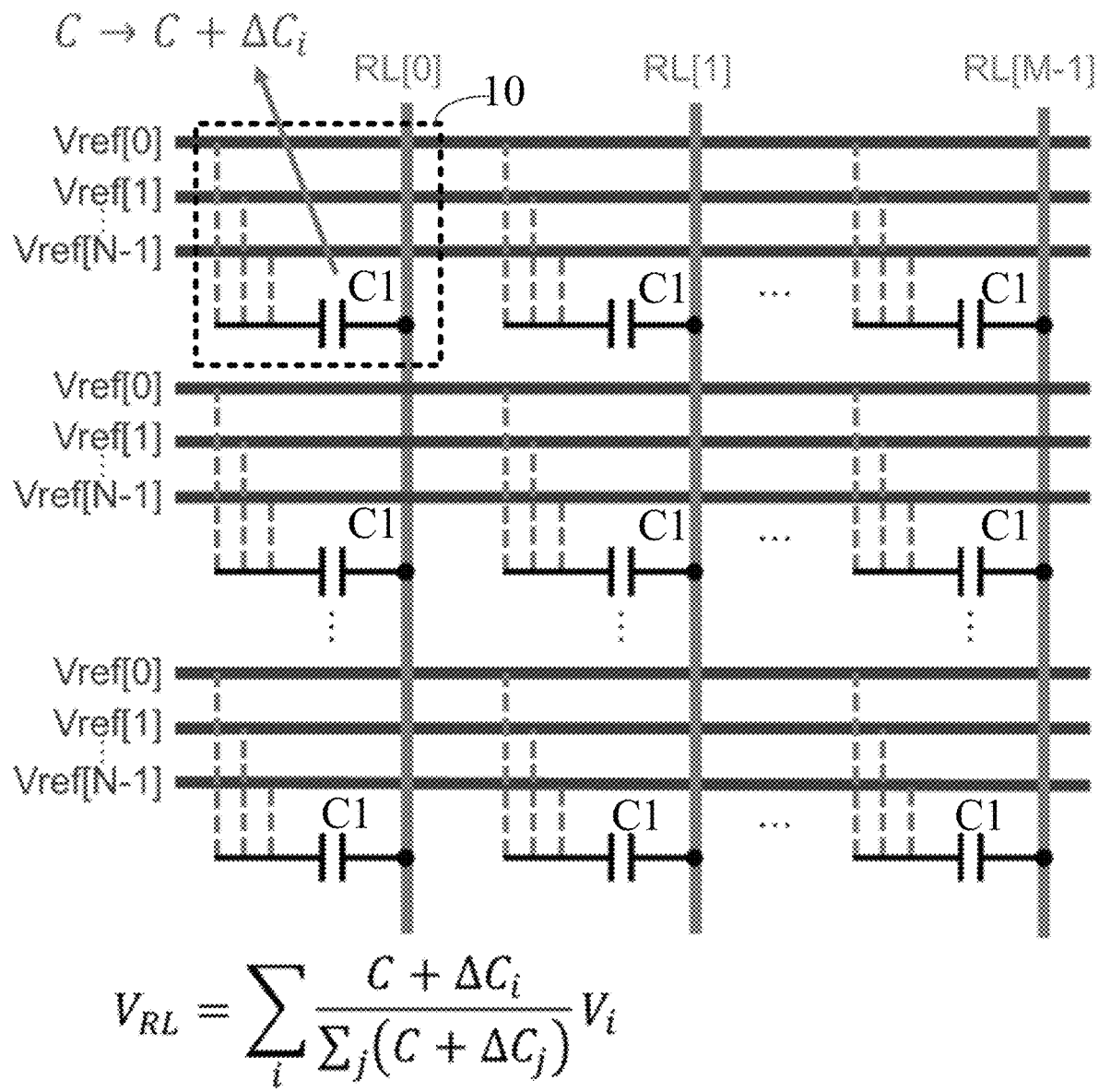
FIG. 7 is a schematic diagram illustrating the third implementation of the SMCS cell in an SMCS device based on an embodiment of the present disclosure.

Please refer to FIG. 7, which is a schematic diagram illustrating the third implementation of the SMCS cell 10 in an SMCS device based on an embodiment of the present disclosure.

In an embodiment of the present disclosure as shown in FIG. 7, the SMCS cell 10 consists of a first capacitive sensor C1, wherein the first end of the first capacitive sensor C1 is connected to any one of the N wordlines, and the second end of the first capacitive sensor C1 is connected to the bitline. The voltage on each wordline represents the weight value, the wordline connected by the first end of the first capacitive sensor C1 represents the stored weight value in the SMCS cell 10, and N is a positive integer.

In an embodiment of the present disclosure, the desired operations of the SMCS cell include multiplication operation and multiply-accumulation operation, wherein the control module 20 is configured to
- control the bitline to be floating;
- drive the wordlines connected to the first end of the first capacitive sensors C1 so that the SMCS cells 10 represent the target weight values for computing, where the voltages on the wordlines correspond to the target weight values;
- readout the voltage of the bitline and obtain the result of the operation. If the bitline is connected to one SMCS cell 10, the result of the operation is the multiplication between the target weight value and the sensing data from the first capacitive sensor C1. If the bitline is connected to more than one SMCS cell 10, the result of the operation is the accumulation of the multiplication result of each SMCS cell 10, that is, the result of the multiply-accumulation operation.

Exemplarily, multi-level weight storage is implemented by connecting the capacitive sensor in the SMCS cell to different wordlines with different voltages. As shown in FIG. 7, N different voltages are applied to N wordlines of the SMCS cell, and the capacitive sensor in the SMCS cell is connected to the wordlines according to the represented weights. N is a positive integer. Exemplarily, the first wordline is configured as $V_{ref}[0]$, the second wordline as $V_{ref}[1], \ldots$, and the Nth wordline as $V_{ref}[N-1]$. The bitlines are controlled by the control module to a fixed voltage, which is typically a low level, e.g., 0V. For example, if weight value $V_{ref}[W_i]$ needs to be stored in an SMCS cell, denoted as $V_i$, the first end of the capacitive sensor in the SMCS cell is connected to the wordline that is configured with the voltage $V_i$. Therefore, the SMCS cell can contribute a voltage $V=V_i(C+\Delta C_i)/(\Sigma_j(C+\Delta C_j))$ to the bitline, where C is the initial capacitance of the first capacitive sensor C1, and the capacitance changes to $C+\Delta C_i$ when applying a specific external input (e.g., a specific pressure when the sensors are pressure capacitive sensors), $\Sigma_j(C+\Delta C_j)$ is the total capacitance of all first capacitive sensors connected to the bitline after applying specific external inputs. The initial capacitance of the capacitive sensor refers to the capacitance when certain external inputs, serving as a reference, are simultaneously applied to each SMCS cell in the SMCS array. In an embodiment of the present disclosure, the capacitive sensors are pressure capacitive sensors, and the initial capacitance refers to the capacitance when no external pressure is applied. According to the principle of charge conservation and linear superposition, the final voltage on the bitline, denoted as $V_{RL}$, is the sum of the voltages contributed by all SMCS cells connected to this bitline, i.e., $V_{RL}=\Sigma_i V_i(C+\Delta C_i)/(\Sigma_j(C+\Delta C_j))$. This voltage corresponds to the multiply-accumulation result of the transformed sensor data $\Delta C_i \rightarrow (C+\Delta C_i)/(\Sigma_j(C+\Delta C_j))$ and the stored weight data.

Exemplarily, assume that each SMCS cell has four wordlines, and different voltages are applied to the word lines to represent different weights. Exemplarily, the first wordline can be configured as −2V, corresponding to weight data of −2; the second wordline can be configured as −1V, corresponding to weight data of −1; the third wordline can be configured as 0V, corresponding to weight data of 0; the fourth wordline can be configured as 1V, corresponding to weight data of 1. Assuming that the SMCS cell needs to store weight data of 1, then the first end of the capacitive sensor in the SMCS cell is connected to the fourth wordline with 1V voltage. Thus, the SMCS cell contributes a voltage of $V=V_i(C+\Delta C_i)/(\Sigma_j(C+\Delta C_j))=130.4$ mV to the bitline, where C=10 pF is the initial capacitance of the first capacitive sensor C1, the capacitance value changes to $C+\Delta C_i=10.5$ pF after applying specific pressure to the sensor, $\Sigma_j(C+\Delta C_j)=80.5$ pF is the total capacitance of all first capacitive sensors connected to the bitline after applying specific external inputs, and $V_i=1V$ is the voltage of the fourth wordline.

Figure 8:
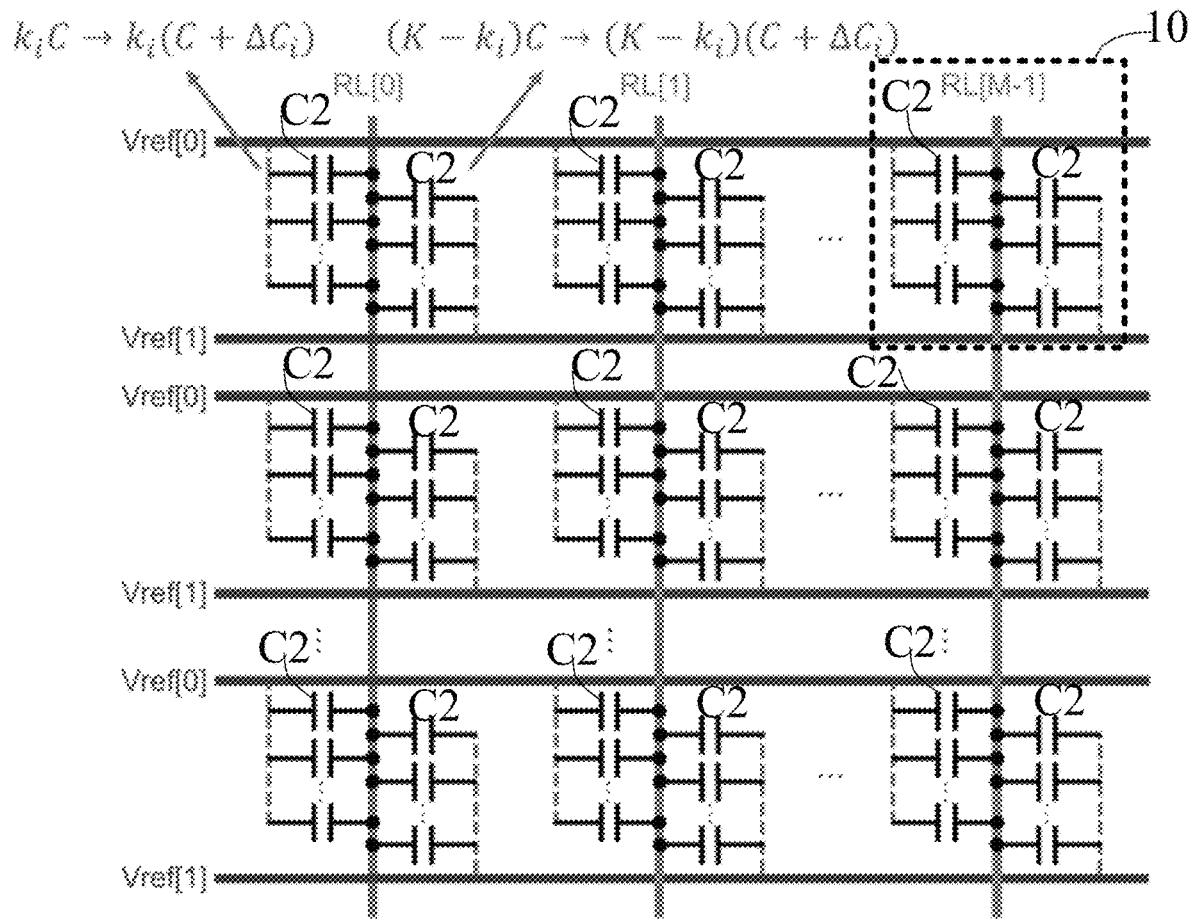
FIG. 8 is a schematic diagram illustrating the fourth implementation of the SMCS cell in an SMCS device based on an embodiment of the present disclosure.

Please refer to FIG. 8, which is a schematic diagram illustrating the fourth implementation of the SMCS cell 10 in an SMCS device based on an embodiment of the present disclosure.

In an embodiment of the present disclosure as shown in FIG. 8, the SMCS cell 10 consists of K second capacitive sensor C2, wherein the first ends of Ki second capacitive sensors C2 are connected to a first wordline, the second ends of said Ki second capacitive sensors C2 are connected to the bitline, the first ends of (K-Ki) second capacitive sensors C2 are connected to a second wordline, the second ends of said Ki second capacitive sensors C2 are connected to the bitline. The number of the second capacitive sensors C2 connected to the first wordline represents the stored weight value in the SMCS cell 10, Ki and K are integers where 0≤Ki<K.

In an embodiment of the present disclosure, the desired operations of the SMCS cell include multiplication operation and multiply-accumulation operation, wherein the control module 20 is configured to
  control the bitline to be floating;
  drive the first wordlines using a high voltage and drive the second wordlines using a low voltage, so that the SMCS cells 10 represent the target weight values for computing;
  readout the voltage of the bitline and obtain the result of the operation. If the bitline is connected to one SMCS cell 10, the result of the operation is the multiplication between the target weight value and the sensing data from the sensing elements. If the bitline is connected to more than one SMCS cell 10, the result of the operation is the accumulation of the multiplication result of each SMCS cell 10, that is, the result of the multiply-accumulation operation.

Exemplarily, multi-level weight storage is implemented by different total initial capacitance of the capacitive sensors in the SMCS cell. In an embodiment of the present disclosure, the different total initial capacitance of the capacitive sensors is implemented by the different numbers of unit capacitive sensors, i.e., second capacitive sensors C2, connected in parallel. As shown in FIG. 8, the SMCS cell contains two wordlines, ki unit capacitive sensors with initial capacitance C, i.e., the second capacitive sensor C2, which are connected in parallel to the first wordline, and (K−k_i) unit capacitive sensors with initial capacitance C which are connected in parallel to the second wordline. K, $k_i$ are integers satisfying $0 \le k_i < K$. Exemplarily, the first wordline is applied with a voltage $V_{ref}[0]=V_{ref}$ and the second wordline is applied with a voltage $V_{ref}[1]=0$ by the control module. Therefore, the SMCS cell can contribute a voltage $V=V_{ref}k_i(C+\Delta C_i)/(\Sigma_j K(C+\Delta C_j))$ to the bitline, where C is the initial capacitance of the second capacitive sensor C2, the capacitance changes to $C+\Delta C_i$ when applying a specific external input (e.g., a specific pressure when the sensors are pressure capacitive sensors), $\Sigma_j K(C+\Delta C_j)$ is the total capacitance of all second capacitive sensors connected to the bitline after applying specific external inputs, the first wordline is connected to a voltage $V_{ref}$ and the second wordline is connected to a low voltage 0V. According to the principle of charge conservation and linear superposition, the final voltage on the bitline, denoted as $V_{RL}$, is the sum of the voltages contributed by all SMCS cells connected to this bitline, i.e., $V_{RL}=\Sigma_i V_{ref}k_i(C+\Delta C_i)/(\Sigma_j K(C+\Delta C_j))$. This voltage corresponds to the multiply-accumulation result of the transformed sensor data $\Delta C_i \rightarrow (C+\Delta C_i)/(\Sigma_j K(C+\Delta C_j))$ and the stored weight data.

Exemplarily, assuming that an SMCS cell needs to store weight data of 3 and K=4. Then, in the SMCS cell, three unit capacitive sensors with initial capacitance of 10 pF are connected to the first wordline in parallel, and one unit capacitive sensor with initial capacitance of 10 pF is connected to the second wordline. The control module can apply a voltage of 5V to the first wordline and 0V to the second wordline. Thus, the SMCS cell contributes a voltage of $V=V_{ref}k_i(C+\Delta C_i)/(\Sigma_j K(C+\Delta C_j))=0.4891V$ to the bitline, where C=10 pF is the initial capacitance of the second capacitive sensor C2, the capacitance value changes to $C+\Delta C_i=10.5$ pF after applying specific pressure to the sensor, $k_i=3$ is the number of the second capacitive sensors C2 connected to the first wordline representing the weight data, K=4 is the total number of unit capacitive sensors in each SMCS cell, $\Sigma_j K(C+\Delta C_j)=322$ pF is the total capacitance of all second capacitive sensors connected to the bitline after applying specific external inputs, and $V_i=5V$ is the high voltage of the first wordline.

In an embodiment of the present disclosure, the multi-level weight storage can be represented by utilizing the total initial capacitance of the capacitive sensor and the pattern of connection to wordlines with different voltages simultaneously.

In an embodiment of the present disclosure, the control module 20 is configured to
  control the voltage of each wordline to any one of the voltages corresponding to the target weight values, high voltage, or low voltage, and control the voltage of each bitline to a first preset voltage, to clear the charge on the capacitive sensors in each SMCS cell 10 before the desired operations of the SMCS cells.

In an embodiment of the present disclosure, for the SMCS circuit based on capacitive sensor, before the desired operation, all wordlines in the SMCS cell are connected to the voltages corresponding to the target weights, e.g., −2V, −1V, 0V, 1V, 2V, and all bitlines are connected to a first preset voltage, which is usually 0V, in order to clear the charge stored in the capacitive sensors of the SMCS cell. After the reset process completed, all wordlines can be unchanged and all bitlines are controlled to be floating to execute the multiplication operation between the stored weights and the input sensor data, as well as the multiply-accumulation operation of the SMCS cell 10 in the column.

It should be understood that the above description of various implementations of the SMCS cell 10 is exemplary and is not intend to restrict the embodiment of the present disclosure.

As mentioned above, a plurality of SMCS cells 10 can arranged in a plurality of rows and a plurality of columns to form an SMCS array with electrical connections. The bitline of the SMCS cells 10 in the same column are connected respectively, and the wordline of the SMCS cells 10 in the same row are connected respectively. By observing the current or voltage changes of the bitlines in the SMCS array, the multiply-accumulation results of the input sensor data and the stored weight can be obtained.

In an embodiment of the present disclosure, a chip that comprises said SMCS device is proposed.

Exemplarily, the chip can be a neural network accelerator chip. By exploiting the SMCS device in the embodiment of the present disclosure, the accelerator chip can efficiently deploy the neural network algorithms for in-situ intelligent processing of edge sensor data. It can greatly reduce the amount of readout analog data from the sensors, thereby reducing the energy and latency costs of data movement and analog-to-digital conversion at the system level. Furthermore, the embodiment of the present disclosure has the advantages of low control and wiring complexity.

Exemplarily, taking handwriting recognition tasks as an example, a neural network (NN) model on the Modified National Institute of Standards and Technology database (MNIST) is designed, where the first layer of the NN model is deployed in the SMCS array of the embodiment of the present disclosure. Exemplarily, assuming that the size of the sensor array is 28×28 with each sensing pixel corresponding to 4 weight data to be multiplied. Each weight data value corresponds to an SMCS cell. The output of the SMCS array is sent to ReLU and then a fully connected layer to obtain the 10-class classification results of handwritten digits. Evaluations show that the edge processing with the embodiment of the present disclosure reduces the amount of sensor data transmission by 7×, compared with the direct readout of raw sensor data in related techniques. With training process considering the hardware characteristics, the proposed system can achieve accuracy of 94% on the test dataset. Compared with related techniques that implement a two-layer fully connected NN model configured with 784-64-10 activations through software, the accuracy loss of the embodiment of the present disclosure is less than 3%.

The embodiment of the present disclosure can maintain high accuracy when considering non-ideal factors such as variation of sensors and parasitic coupling between columns. Taking the above handwriting recognition task as an example, when the signal-to-noise ratio of the sensor input is 20 dB, the classification accuracy loss is less than 3% compared with the ideal case without the noise. When the single-sided coupling capacitance between columns is 20% of the computing capacitance of a single column, the accuracy loss is less than 3% compared with the ideal case without the coupling.

Therefore, it can be seen that the SMCS device proposed in the embodiment of the present disclosure can achieve in-situ sensing, storage, and computation at the edge by sensor devices only. It has the characteristics of low complexity, low latency, high reliability, and high energy efficiency.

In an embodiment of the present disclosure, an electronic device that comprises said chip.

Exemplarily, the electronic device can be a terminal device, which may be a user equipment (UE), a mobile device, a user terminal, a handheld device, a computing device, or an on-board device, etc. Examples of terminal devices include mobile phones, tablets, laptops, PDAs, mobile internet devices (MID), wearable devices, virtual reality (VR) devices, augmented reality (AR) devices, wireless terminals in industrial control, wireless terminals in self-driving, wireless terminals in remote medical surgery, wireless terminals in smart grid, wireless terminals in transportation safety, wireless terminals in smart city, wireless terminals in smart homes, wireless terminals in the internet of vehicles, etc.

The embodiment of the present disclosure has been described above. The above description is exemplary rather than exhaustive, and also, is not limited to the disclosed embodiments. Without being out of the scope and spirit of the illustrated embodiments, multiple modifications and changes will be obvious to those of ordinary skill in the art. The terms used herein have been selected to best explain the principles, practical applications, or improvements to the technologies in the market of each embodiment, and to enable others of ordinary skill in the art to understand the various embodiments disclosed herein.

What is claimed is:

1. A SMCS device comprising:
a plurality of SMCS cells, wherein each SMCS cell comprises K sensing elements, where the first end of each sensing element is connected to wordline, the second end of each sensing element is connected to bitline, the sensing element can sense changes in external inputs, and K is an integer greater than or equal to zero;
a control module connected to the wordlines and bitlines of each SMCS cell, wherein the control module is configured to
control the voltages of each wordline and bitline so that the SMCS cell can perform desired operations, and
sense the voltage or current on bitlines to obtain the operation results.

2. The SMCS device according to claim 1 wherein the sensing elements include resistive sensors or capacitive sensors, and the stored value of the SMCS device is represented by at least one of the total initial resistance of the resistive sensor under a first preset input condition, the total initial capacitance of the capacitive sensor under a second preset input condition, and the pattern of connection between the sensing elements in the SMCS cell and the wordlines,
wherein the resistive sensor can change its resistance according to the sensed external inputs, and the capacitive sensor can change its capacitance according to the sensed external inputs.

3. The SMCS device according to claim 2 wherein the SMCS cell consists of a first resistive sensor, wherein the first end of the first resistive sensor is connected to any one of the N wordlines, and the second end of the first resistive sensor is connected to the bitline,
wherein the voltage on each wordline represents the weight value, the wordline connected by the first resistive sensor represents the stored weight value in the SMCS cell, and N is a positive integer.

4. The SMCS device according to claim 3 wherein the desired operations of the SMCS cell include multiplication operation and multiply-accumulation operation, wherein the control module is configured to:
drive the wordlines connected to the first end of the first resistive sensors so that the SMCS cells represent the target weight values for computing, where the voltages on the wordlines correspond to the target weight values;
control the voltage on the bitline to a low voltage; and
readout the current of the bitline and obtain the result of the operation;
wherein, if the bitline is connected to one SMCS cell, the result of the operation is the multiplication between the target weight value and the sensing data from the first resistive sensor, and if the bitline is connected to more than one SMCS cell, the result of the operation is the accumulation of the multiplication result of each SMCS cell, that is, the result of the multiply-accumulation operation.

5. The SMCS device according to claim 2 wherein the SMCS cell consists of more than one second resistive sensor, wherein the first ends of the second resistive sensors are connected to the same wordline, and the second ends of the second resistive sensors are connected to the bitline,
wherein the number of the second resistive sensors represents the stored weight value in the SMCS cell.

6. The SMCS device according to claim 5 wherein the desired operations of the SMCS cell include multiplication operation and multiply-accumulation operation, wherein the control module is configured to:
drive the wordlines connected to the first end of the second resistive sensors using a high voltage, so that the SMCS cells represent the target weight values for computing;
control the voltage on the bitline to a low voltage; and
readout the current of the bitline and obtain the result of the operation;
wherein, if the bitline is connected to one SMCS cell, the result of the operation is the multiplication between the target weight value and the sensing data from the sensing elements, and if the bitline is connected to more than one SMCS cell, the result of the operation is the accumulation of the multiplication result of each SMCS cell, that is, the result of multiply-accumulation operation.

7. The SMCS device according to claim 2 wherein the SMCS cell consists of a first capacitive sensor, wherein the first end of the first capacitive sensor is connected to any one of the N wordlines, and the second end of the first capacitive sensor is connected to the bitline,
wherein the voltage on each wordline represents the weight value, the wordline connected by the first capacitive sensor represents the stored weight value in the SMCS cell, and N is a positive integer.

8. The SMCS device according to claim 7 wherein the desired operations of the SMCS cell include multiplication operation and multiply-accumulation operation, wherein the control module is configured to:
control the bitline to be floating;
drive the wordlines connected to the first end of the first capacitive sensors so that the SMCS cells represent the target weight values for computing, where the voltages on the wordlines correspond to the target weight values; and
readout the voltage of the bitline and obtain the result of the operation;
wherein, if the bitline is connected to one SMCS cell, the result of the operation is the multiplication between the target weight value and the sensing data from the first capacitive sensor, and if the bitline is connected to more than one SMCS cell, the result of the operation is the accumulation of the multiplication result of each SMCS cell, that is, the result of the multiply-accumulation operation.

9. The SMCS device according to claim 2 wherein the SMCS cell consists of K second capacitive sensor, wherein the first ends of Ki second capacitive sensors are connected to a first wordline, the second ends of said Ki second capacitive sensors are connected to the bitline, the first ends of (K-Ki) second capacitive sensors are connected to a second wordline, the second ends of said Ki second capacitive sensors are connected to the bitline,
wherein the number of the second capacitive sensors connected to the first wordline represents the stored weight value in the SMCS cell, Ki and K are integers where $0 \leq Ki < K$.

10. The SMCS device according to claim 9 wherein the desired operations of the SMCS cell include multiplication operation and multiply-accumulation operation, wherein the control module is configured to:
control the bitline to be floating;
drive the first wordlines using a high voltage and drive the second wordlines using a low voltage, so that the SMCS cells represent the target weight values for computing; and
readout the voltage of the bitline and obtain the result of the operation;
wherein, if the bitline is connected to one SMCS cell, the result of the operation is the multiplication between the target weight value and the sensing data from the sensing elements, and if the bitline is connected to more than one SMCS cell, the result of the operation is the accumulation of the multiplication result of each SMCS cell, that is, the result of the multiply-accumulation operation.

11. The SMCS device according to claim 1 wherein the plurality of SMCS cells are arranged in a plurality of rows and a plurality of columns with electrical connections, the bitline of the SMCS cells in the same column are connected respectively, and the wordline of the SMCS cells in the same row are connected respectively.

12. The SMCS device according to claim 7 wherein the control module is configured to control the voltage of each wordline to any one of the voltages corresponding to the target weight values, high voltage, or low voltage, and control the voltage of each bitline to a first preset voltage, to clear the charge on the capacitive sensors in each SMCS cell before the desired operations of the SMCS cells.

13. A chip wherein the chip comprises a SMCS device comprising:
a plurality of SMCS cells, wherein each SMCS cell comprises K sensing elements, where the first end of each sensing element is connected to wordline, the second end of each sensing element is connected to bitline, the sensing element can sense changes in external inputs, and K is an integer greater than or equal to zero;
a control module connected to the wordlines and bitlines of each SMCS cell, wherein the control module is configured to
control the voltages of each wordline and bitline so that the SMCS cell can perform desired operations, and
sense the voltage or current on bitlines to obtain the operation results.

14. An electronic device wherein said electronic device comprises a chip comprising a SMCS device, the SMCS device comprising:
- a plurality of SMCS cells, wherein each SMCS cell comprises K sensing elements, where the first end of each sensing element is connected to wordline, the second end of each sensing element is connected to bitline, the sensing element can sense changes in external inputs, and K is an integer greater than or equal to zero;
- a control module connected to the wordlines and bitlines of each SMCS cell, wherein the control module is configured to
- control the voltages of each wordline and bitline so that the SMCS cell can perform desired operations, and
- sense the voltage or current on bitlines to obtain the operation results.

* * * * *